Jan. 26, 1932.  H. PRINS  1,842,946
BELT CONTROL APPARATUS
Filed March 14, 1930   4 Sheets-Sheet 3
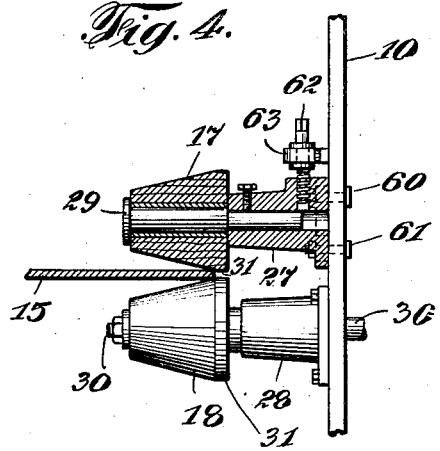
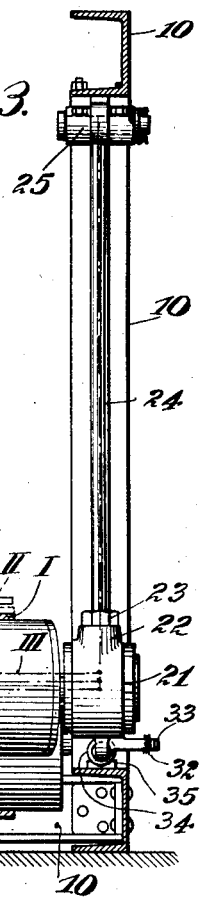
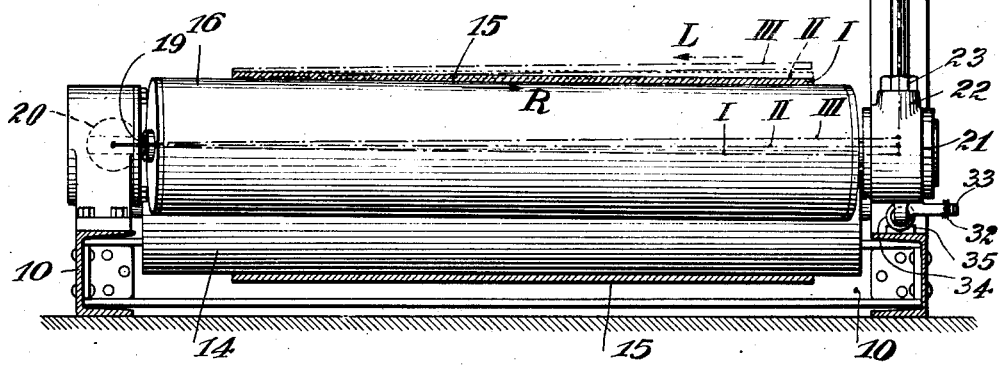
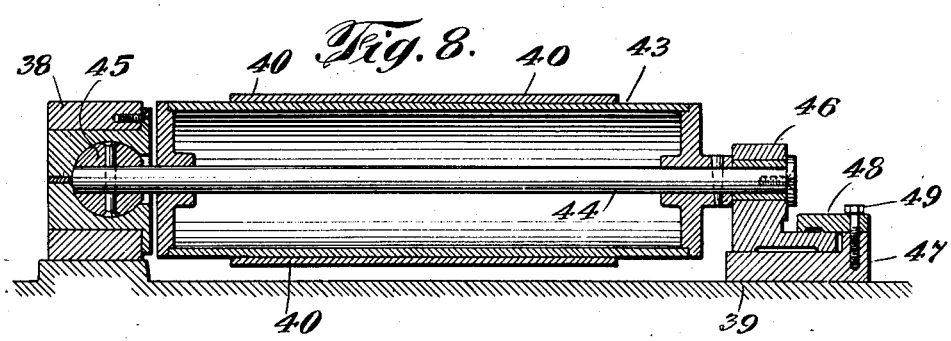
INVENTOR
Henry Prins
BY Arthur H. Serrell Jr.
his ATTORNEY

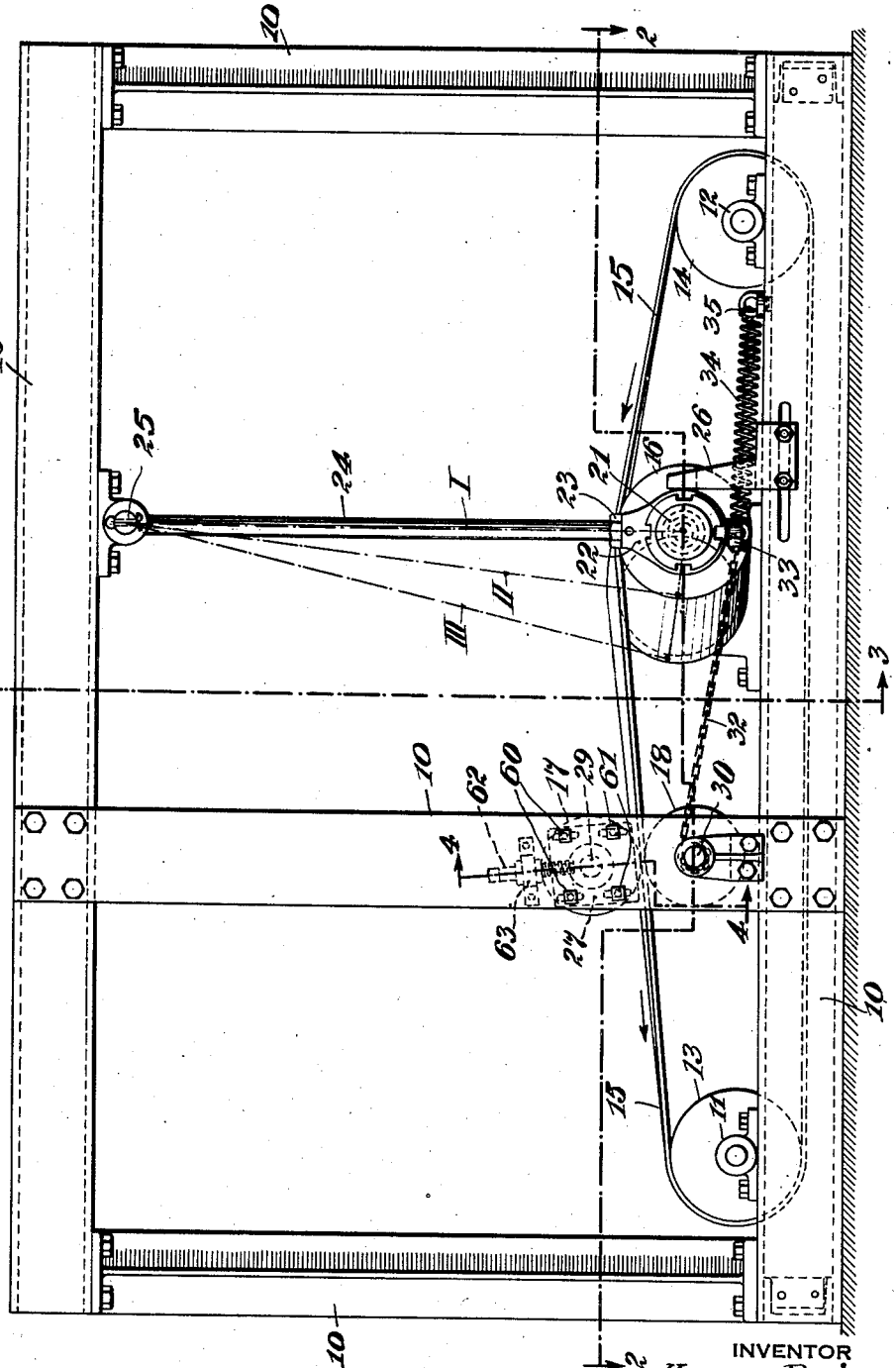

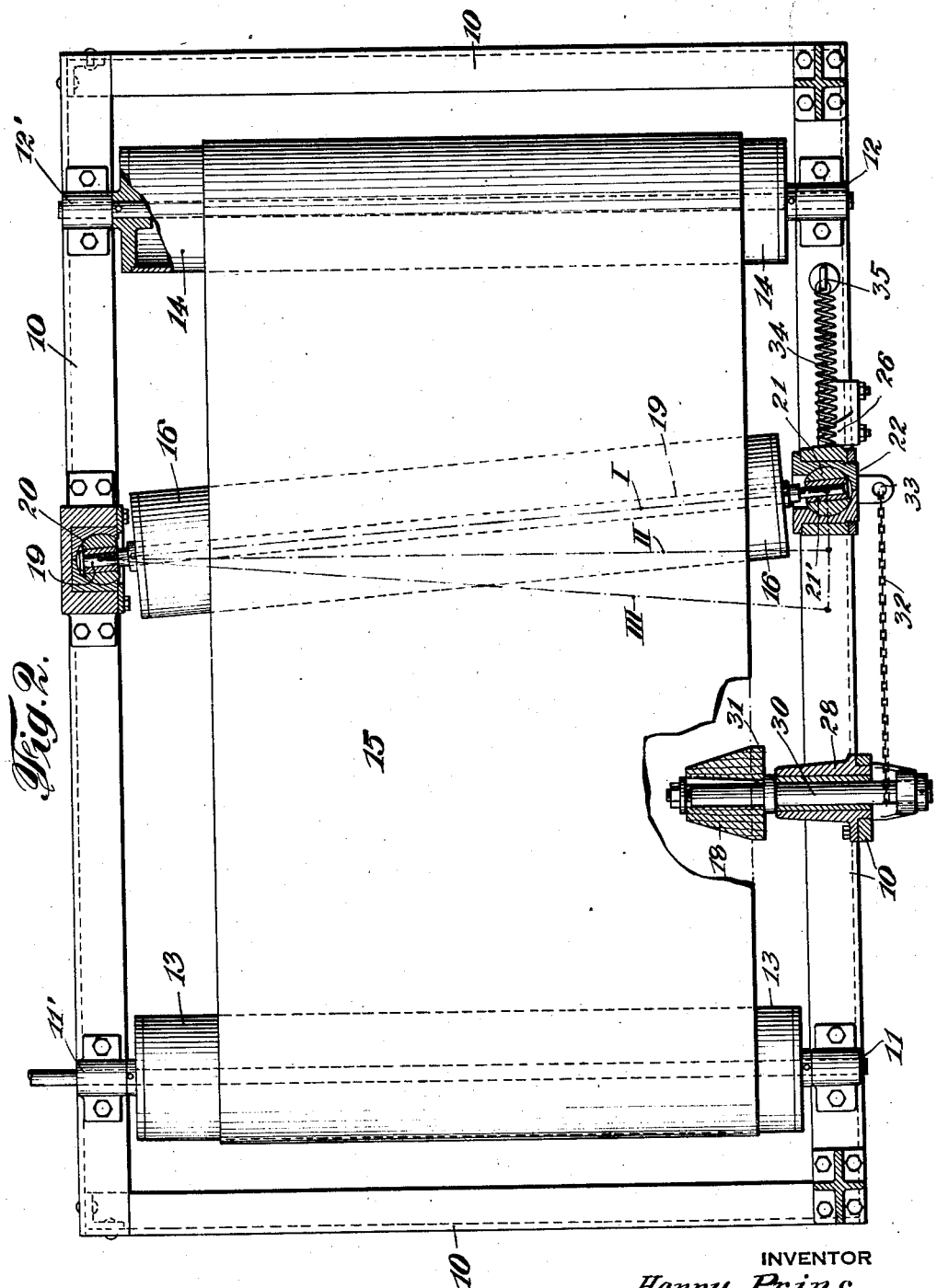

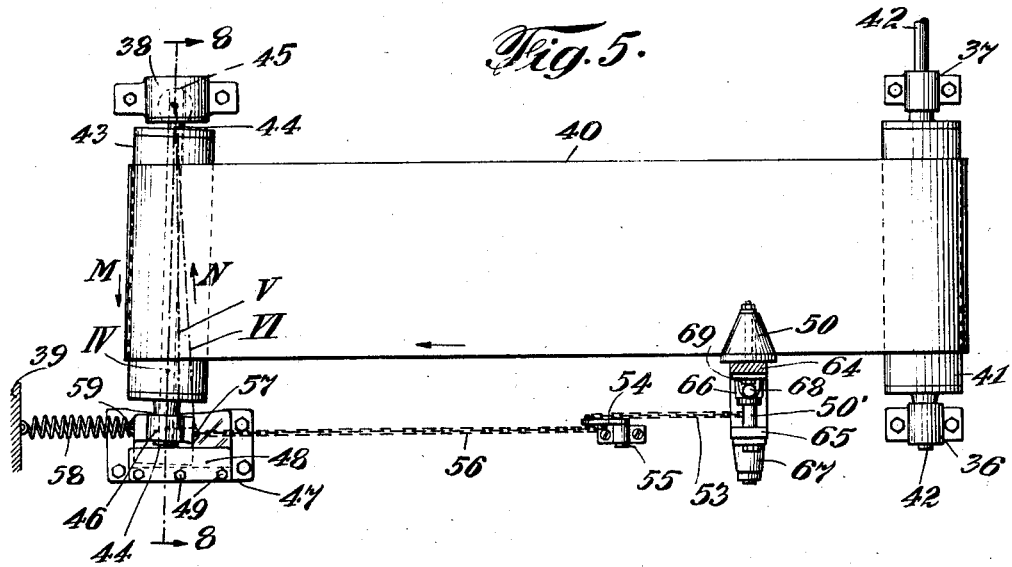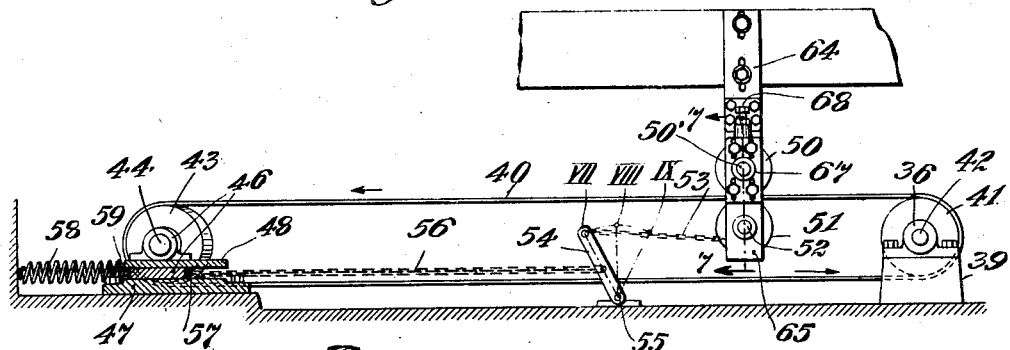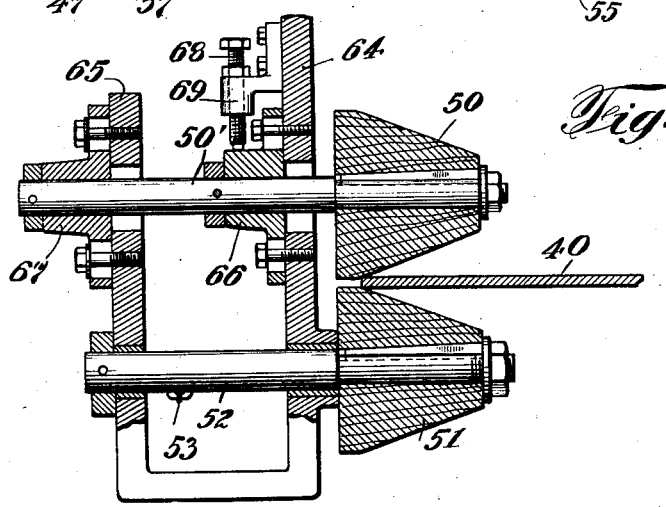

Patented Jan. 26, 1932

1,842,946

UNITED STATES PATENT OFFICE

HENRY PRINS, OF COLUMBIAVILLE, NEW YORK, ASSIGNOR OF ONE-HALF TO HIMSELF AND ONE-HALF TO WILLIAM H. GREEN, OF NEW YORK, N. Y.

BELT CONTROL APPARATUS

Application filed March 14, 1930. Serial No. 435,708.

This invention relates to an improvement in belt control apparatus by which a belt is automatically made to travel substantially in a predetermined position on its pulleys. It is well known and generally appreciated that as usually constructed the side movement of a belt on its pulley often becomes relatively large, due to the wear or stretch in the belt, or improper alignment of the pulleys, and frequently becomes of sufficient proportions for the belt to slip off its pulley entirely. It is obvious that such occurrences retard production and necessitate wasting of valuable time in repairs.

I prefer to utilize the invention as hereinafter described in the capacity of an automatic felt guide for paper making machines, although it will be understood that it is not limited to this use.

The object of my invention is to provide a means that will permit the adjustment and regulation of the side movement of a belt on its pulley automatically and thereby positively defeat any tendency of the belt to slip off its pulley, as will be hereinafter more particularly described. I attain this object by the mechanism illustrated by the drawings in which Figure 1 is a side elevation of the belt control apparatus, illustrating one form of my present invention, Fig. 2 is a plan and partial section on line 2—2, Fig. 1, Fig. 3 is a front elevation and partial section on line 3—3, Fig. 1, Fig. 4 is a section on line 4—4, Fig. 1, Fig. 5 is a plan showing a modification of the invention, Fig. 6 is a side elevation of the construction shown in Fig. 5, Fig. 7 is an enlarged section on line 7—7, Fig. 6, and Fig. 8 is an enlarged section on line 8—8, Fig. 5.

Referring to the drawings and more particularly to Figs. 1 to 4 inclusive, the apparatus to which this invention relates is supported in a frame 10. Located in suitable positions and connected to the frame 10 by bearings 11, 11' and 12, 12' are pulleys or rollers 13 and 14 respectively over which a belt 15 is adapted to move. Any convenient source of power is applied to rotate the roller 13 through its shaft, thus moving the belt in the direction as shown by the arrows in Fig. 1 and transmitting the rotation to the roller 14 where the power so transmitted is utilized in any manner well known in the art.

Associated with the belt 15 is a movable roller 16 and a pair of adjustable cones 17 and 18 which will be hereinafter more fully described.

Referring to Figs. 2 and 3 the movable roller 16 is adapted to rotate on a shaft 19 journaled in bearings 20 and 21. The housing of the bearing 20 is fixedly connected to the lower portions of the frame 10 and permits the movement of the shaft 19 and consequently the roller 16 in both a vertical and horizontal direction. The bearing 21 is enclosed in a housing 22 suitably connected by means of a nut 23, or otherwise, to one end of an arm 24. Located in the bearing 21 is a bushing 21' permitting the movement of the shaft 19 therein. Both the bearings 20 and 21 form ball and socket joints in their respective housings thus permitting the free movement of the roller 16 in any direction without strain on the shaft 19. The opposite end of the arm 24 is pivotally connected to an upper portion of the frame 10, as indicated at 25. The housing 22 is adapted to oscillate about this pivot 25 and in so doing positions the roller to control the side movement of the belt.

Different positions of the housing 22 are illustrated as I, II and III in Figs. 1, 2 and 3. The horizontal position of the roller is shown when the housing is in position II. When the housing takes the position corresponding to III the belt tends to shift in the direction L as shown by the arrow in Fig. 3 due to the raised position of the housing 22 over the position II. When in position I the belt has the tendency to shift in the direction R indicated by the arrow in Fig. 3 due to the lowered position of the housing 22 from the position II. A stop 26 is adapted to prevent the housing from any movement beyond that of position I which will be hereinafter called the normal initial position.

Adjacent and at the side of the belt 15 is located the pair of cones 17 and 18, Figs. 1 and 2. Referring more particularly to Fig. 4 the cones 17 and 18 are fixedly attached to the frame 10 through bearing members 27 and 28 and shafts 29 and 30 at the ends of which said cones are mounted. Located at the inner side of the cone members is a flat surface 31. The belt 15 is adapted to be guided by the sloping side of the cones into the flat surface 31 which grips the belt and transmits the movement of the same to the cones 17 and 18 and shafts 29 and 30.

One end of a chain 32 is connected to the shaft 30. The other end of the chain 32 is connected to the housing 22 as indicated at 33. Also connected at one end to the housing 22 there is a spring 34 the opposite end of which is connected to the frame 10 as indicated at 35. The spring 34 is of sufficient strength to normally maintain the housing 22 below its horizontal position II and in the position I when the belt is out of engagement with the cones so that the same will shift laterally on the roller in a direction towards the cones.

In the operation of the mechanism it will now be clearly understood that when the housing 22 maintains the roller below the position II through the action of the spring 34 the belt will move in the direction R, as shown by the arrow in Fig. 3, along the side of the cones 17 and 18 into the flat surface 31, thus rotating the said cones. The rotation of cone 18 is transmitted to the shaft 30 which winds the chain 32 on its circumference and moves the housing 22 against action of the spring 34 through the position II into the position III. The belt then tends to move in the direction L which moves the belt out of contact with the surfaces 31, releasing the rotative effect in the cones 17 and 18. The spring 34 draws the housing below its horizontal position and the parts are in the normal initial position I to repeat the cycle of shifting the belt. In this manner the position of the roller changes to control the lateral movement of the belt thereon through predetermined limits.

Referring to Figs. 5, 6, 7 and 8 a modification of the invention is illustrated. Bearing housings 36, 37 and 38 are fixedly connected to the lower portion of a frame 39. A belt 40 moves over a pair of pulleys, one pulley 41 being held firmly on a shaft 42 rotating in bearings located in the stationary housings 36 and 37. The other pulleys 43, mounted on a shaft 44, is adapted to move in a horizontal plane at the end journaled in the fixed housing 38, as will be hereinafter more particularly described.

One end of the shaft 44 turns in a ball and socket bearing, as indicated at 45 in Fig. 8. The other end is journaled in a slide member 46. The slide member 46 is adapted to move on a block 47 which is fixedly connected to the lower part of the frame 39. A guide member 48, which is bolted to the block 47, as indicated at 49, retains the slide member between its lower surface and the upper surface of the block and maintains the shaft 44 in all positions thereof in a substantially horizontal plane. It will now be obvious that the pulley 43 pivots in the ball and socket bearing 45 and is adapted to move on the slide member 46 into any one of the positions IV, V, and VI, Fig. 5.

Adjacent and at the side of the belt 40 there is located a pair of cones 50 and 51, the said cones are mounted and adapted to function in substantially the same manner as the cones 17 and 18. When the cone 51 rotates it turns a shaft 52 on which it is mounted, and a chain 53, one end of which is fixedly connected to the shaft 52, is adapted to wind on the said shaft. The opposite end of the chain 53 is connected to a lever 54 which pivots about a point indicated at 55, said point being fixedly connected to the lower portion of the frame 39. One end of a chain 56 is connected to the central portion of the lever 54, the other end being connected to the slide member 46, as indicated at 57. A spring member 58 is connected to the frame 39 and to the slide member 46, as indicated at 59, the action of which will be hereinafter more fully described.

Referring to Fig. 5 the movement of the slide member 46 is regulated by the action of the spring 58 and chains 53 and 56. The spring 58 is of sufficient strength to normally maintain the pulley 43 in position IV. The proper alignments of the shafts 42 and 44 occur when the shaft 44 is in position V. The arrow X indicates the direction in which the belt 40 is moving and because of the action of the spring 58 the pulley 43 is normally maintained in position IV. The tendency of the belt, which travels around half the circumference of the pulley 43, is to climb upwardly on the pulley, thus moving in the direction M, as indicated by the arrow, Fig. 5. The belt in consequence of this change in position comes into contact with the surfaces of the cones 50 and 51, thereby rotating the shaft 52 and winding the chain 53 upon it. Referring to Fig. 6, it will be seen that the position of the lever, due to the shortening of the chain 53, changes from position VII to IX. This action, by the movement of the chain 56, elongates the spring 58 and places the pulley 43 in the position VI. The belt 40 then has the tendency to move in the direction N, as indicated by the arrow, thus disengaging the belt and cones. The action of the spring 58 then returns the mechanism to position IV Fig. 5, and the parts of the device are in position for a repetition of the cycle of operation.

It will be understood that in order to accommodate belts of different thicknesses it may be necessary to make the cones 17 and 18 adjustable to position relatively to one another. To accomplish this purpose, for example, in the construction illustrated in Figs. 1 to 4 inclusive, the bearing bracket 27, in which the shaft for the cone 17 is mounted, may be adjustably secured to the frame member 10 by means of suitable bolts 60 and 61 which pass through this frame member and also through slots provided therefor in the base of the bearing bracket 27. This bearing bracket is adjustable to position when the bolts 60 and 61 are loosened by means of an adjusting screw 62 which is suitably swivelled or otherwise journaled in a bracket 63 carried by the frame member 10 as shown in Fig. 7. The cones 50 and 51 are adjustable to position relatively to each other by being adjustably mounted on a shaft 50' upon which the cone 50 turns in the members 64 and 65 of the hanger employed to carry the cones. In order to accomplish this, the shaft 50' may be journaled in brackets 66 and 67 adjustably connected to the parts 64 and 65 of the hanger by being secured thereto by means of suitable bolts or otherwise. In this structure when the bolts are loosened the shaft 50', and consequently the cone 50, may be adjusted to the desired position by means of an adjusting screw 68 which is mounted to turn in a bracket 69 carried by the member 64. Moreover, it will also be understood that the means as described for adjustably mounting the cones is merely illustrative as other and equivalent constructions may be employed for this purpose. It will be obvious, moreover, that while the apparatus as herein shown and described are designs adapted to advantageously carry out the invention that other and equivalent structures may be employed without departing from the nature and spirit of the invention.

I claim as my invention:

1. In combination, a belt, a roller over which the said belt travels, means for mounting the roller to be shiftable to a plurality of positions, the said roller normally being in a position in which the belt while traveling over the same is shifted laterally in one direction, devices controlled by spaced friction cones operative after the belt is shifted a predetermined distance in the said direction for moving the said roller to a position in which the belt while traveling over the roller is shifted laterally in the opposite direction, and means then operative for returning the said roller to its normal initial position.

2. In combination, a belt, a roller, a shaft on which the roller is secured, means for mounting the shaft to make the roller shiftable to a plurality of positions, the said roller being normally in a position in which the belt in traveling over the same is shifted laterally in one direction, devices controlled by a pair of cones operative after the belt is shifted a distance laterally in the said direction to engage the cones for shifting the said roller and shaft to a position in which the said belt while traveling on the roller is shifted in the opposite direction laterally, and means then operative for returning the said roller and shaft to their initial positions.

3. In combination, a belt, a roller over which the said belt travels, devices for mounting the roller to be movable to position, the said roller being normally in a position in which the belt while traveling over the said roller is shifted laterally in one direction, a set of cones between which the edge of the belt is moved to operate the cones after the belt is shifted laterally a predetermined distance in the said direction, means actuated by the operation of the cones for shifting the said roller to a position in which the belt while traveling over the roller is shifted in the opposite direction and thereby moved away from the said cones, and means then operative for returning the said roller to its normal initial position.

4. In combination, a belt, a roller over which the said belt travels, devices for mounting the roller to be movable to position, the said roller being normally in a position in which the belt while traveling over the said roller is shifted laterally, in one direction, a pair of cones, means upon which the cones are revolubly mounted, a connection between one of the said cones and the said roller, the edge of the belt after being shifted a predetermined distance in the said direction engaging the said cones and causing the same through the said connection to move the said roller to a position in which the belt shifts in the opposite direction and thereby runs out of contact with the said cones, and means then operative for returning the said roller to its normal initial position.

5. In combination, a belt, a roller over which said belt travels, means for mounting the roller to be movable to one of a plurality of positions, the said roller being normally in a position in which the belt while traveling over the same is shifted laterally in one direction, a pair of cones, shafts adjustable relatively to position and upon which the said cones are mounted, a chain connected at one end to the shaft of one of the said cones and at the other end to one end of the said roller, the edge of the belt after being shifted laterally a predetermined distance in said direction, being adapted to engage the said cones causing the same to turn to thereby wind the chain on the shaft to which it is connected and through the chain to shift the said roller to a position in which the belt is shifted laterally in the opposite direction and thereby runs out of contact with the said cones, and a spring then operative for returning the said roller to its normal initial position causing the chain to unwind from the said shaft and setting the parts of the apparatus in place to repeat the cycle.

6. In combination, a belt, pulleys over which the said belt travels, a roller over which the belt also travels, the said roller being normally in a position in which the belt shifts laterally in one direction thereon, devices controlled by a friction cone operative when the belt is shifted laterally a predetermined distance in said direction to engage the cone for moving the said roller to a position in which the belt shifts laterally in the other direction while traveling thereon, and means then operative for returning and normally maintaining the roller to and in its initial position.

7. In combination, a belt, pulleys over which the said belt travels, a roller over which the said belt also travels, means for mounting the roller to be shiftable into any one of a plurality of positions, the said roller being normally in an initial position in which the said belt in traveling over the same is shifted laterally in one direction, a set of cones between which one edge of the belt when so shifted is engaged to turn the cones, means operative by the turning of the said cones for moving the said roller to a position in which the belt while traveling over the same is shifted in the opposite direction causing the edge of the belt to move away from the cones, and means then operative for returning the roller to its normal initial position.

8. In combination, a belt, pulleys over which the said belt travels, a roller over which the said belt also travels, devices for mounting the roller to be movable to any one of a plurality of positions, the said roller normally being in a position in which the belt while traveling over the same is shifted laterally in one direction, a set of cones between which an edge of the belt engages to turn the cones when the belt is shifted laterally as aforesaid, a connection between the said cones and the said roller whereby the operation of the cones causes the roller to be moved to a position in which the belt while traveling over the same is shifted in the opposite direction and moves away and is free from the said cones, a stop for determining the initial position of the said roller, and a spring operative for returning the said roller to and maintaining the same normally in contact with the said stop.

9. In combination, a belt, a roller over which the said belt travels, means for mounting the roller to be shiftable to a plurality of positions, the said roller normally being in a position in which the belt while traveling over the same is shifted laterally in one direction, devices operable after the belt is shifted a predetermined distance in the said direction for moving the said roller to a position in which the belt while traveling over the roller is shifted laterally in the opposite direction, and means then operative for returning the said roller to its normal initial position.

Signed by me this 27th day of February, 1930.

HENRY PRINS.